(12) United States Patent
Balkan et al.

(10) Patent No.: US 8,402,314 B2
(45) Date of Patent: Mar. 19, 2013

(54) DEBUG REGISTERS FOR HALTING PROCESSOR CORES AFTER RESET OR POWER OFF

(75) Inventors: Deniz Balkan, Santa Clara, CA (US); Kevin R. Walker, Los Gatos, CA (US); Mitchell P. Lichtenberg, Jr., Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 12/963,975

(22) Filed: Dec. 9, 2010

(65) Prior Publication Data

US 2012/0151264 A1     Jun. 14, 2012

(51) Int. Cl.
    *G06F 11/00*     (2006.01)
(52) U.S. Cl. ............................... 714/31; 714/27
(58) Field of Classification Search .................. None
    See application file for complete search history.

(56) References Cited

U.S. PATENT DOCUMENTS

| | | | |
|---|---|---|---|
| 5,970,241 A | 10/1999 | Deao | |
| 6,311,292 B1 | 10/2001 | Choquette et al. | |
| 6,370,660 B1 | 4/2002 | Mann | |
| 6,839,654 B2 | 1/2005 | Rollig et al. | |
| 8,136,003 B2 * | 3/2012 | Swoboda | 714/726 |
| 2002/0133794 A1 | 9/2002 | Kanapathippillai | |
| 2002/0184561 A1 | 12/2002 | Tagawa | |
| 2005/0193254 A1 | 9/2005 | Yee | |
| 2006/0069953 A1 | 3/2006 | Lippett et al. | |
| 2006/0156070 A1 * | 7/2006 | Swoboda | 714/38 |
| 2007/0214389 A1 * | 9/2007 | Severson et al. | 714/30 |
| 2009/0006808 A1 | 1/2009 | Blumrich | |
| 2009/0282304 A1 | 11/2009 | Piry et al. | |
| 2012/0124424 A1 * | 5/2012 | Gorti et al. | 714/27 |
| 2012/0159251 A1 * | 6/2012 | Wu et al. | 714/30 |

FOREIGN PATENT DOCUMENTS

EP      0869434 A2    10/1998

OTHER PUBLICATIONS

"Setup the Debugger for a CoreSight System," Aug. 11, 2010, 27 pages.
Search report and Written Opinion; PCT/US2011/063311; dated Mar. 29, 2012.
EP Search report; 11192311.6; dated Mar. 23, 2012.
Bohr M: "The new era of scaling in an SoC 1-18 world" Solid-State Circuits Conference—Digest of Technical Papers 2889. ISSCC 2889. IEEE International IEEE Piscataway NJ, USA Feb. 8, 2889 (2889-82-88) pp. 23-28 XP831742153 ISBN: 978-1-4244-3458-9.

* cited by examiner

*Primary Examiner* — Michael Maskulinski
(74) *Attorney, Agent, or Firm* — Lawrence J. Merkel; Meyertons, Hood, Kivlin, Kowert & Goetzel, P.C.; Erik A. Heter (57) ABSTRACT

A method and apparatus of stopping a functional block of an integrated circuit (IC) for debugging purposes is disclosed. In one embodiment, an IC includes a number of functional units accessible by an external debugger via a debug port (DP). During a debug operation, a power controller in the IC may power down a functional unit. When the functional unit is powered off, a first register may be programmed. Responsive to the programming of the first register, a first signal may be asserted and provided to the functional unit. When power is restored to the functional unit, operation of the functional unit may be halted prior to execution of instructions or other operations, responsive to the signal.

9 Claims, 6 Drawing Sheets

DEBUG REGISTERS FOR HALTING PROCESSOR CORES AFTER RESET OR POWER OFF

BACKGROUND

1. Field of the Invention

This invention relates to integrated circuits, and more particularly, to mechanisms for debugging integrated circuits.

2. Description of the Related Art

Integrated circuits (ICs) and electronic assemblies are typically tested prior to shipping to a customer. One such testing mechanism developed for testing connections of ICs to printed circuit boards (PCB's) is known as boundary scan. Boundary scan testing is based on the IEEE 1149.1 Standard, which is commonly known as Joint Test Action Group (JTAG). Although originally developed for boundary scan testing, the uses of the JTAG architecture have expanded in recent years. For example, JTAG ports are sometimes used to access internal functional blocks of an IC for testing. Moreover, the use of JTAG access ports has been further expanded for use in debugging IC designs as well as software designed to execute on such ICs.

The expanding use of JTAG access ports has spurred further development in providing internal access to ICs. Many ICs now include a debug port (DP) having multiple JTAG access ports coupled to various internal components. The DP may also include one or more serial wire port (SWPs), memory access ports, and other types of ports that enable the accessing of internal IC functional blocks for debugging purposes. Such access ports convey various signals to accessible functional blocks, including data signals and clock signals. For example, test input data, clock, and mode select signals may be conveyed to a functional block through a JTAG port, while test output data may be received through the JTAG port. Some ICs, such as processors, may also include debug registers. Such debug registers may be programmed by executing processor code in a processor core.

SUMMARY

A method and apparatus of stopping a functional block of an integrated circuit (IC) for debugging purposes is disclosed. In one embodiment, an IC includes a number of functional units accessible by an external debugger via a debug port. During a debug operation, a power controller in the IC may put the functional unit to sleep and/or power down a functional unit. Prior to or during the time that the functional unit is asleep/powered off, a first register may be programmed. Responsive to the programming of the first register and subsequent to putting the functional unit to sleep, a first signal may be asserted and provided to the functional unit. When power is restored to the functional unit or the functional unit is reset, operation of the functional unit may be halted prior to execution of instructions or other operations, responsive to the signal. Thus, the programming of the first register may signal the intention to halt the functional unit at the next reset, but the halt may be delayed until such reset occurs.

The method and apparatus may also be used in conjunction with a reset operation. A debugger coupled to the debug port may program a second register to cause a reset of each of the functional units of the IC or selected functional units of the IC, with the exception of the debug port and associated debug circuitry. The first register may also be programmed, either by the debugger or responsive to the programming of the second register. The first register may be programmed prior to resetting the functional unit. The first signal may be received by a functional unit subsequent to initiating the reset. Responsive to receiving the first signal, the functional unit may halt operation upon exiting the reset.

In one embodiment, the IC may be a multi-core processor. Each of the processor cores may be coupled to a debug port via a debug bus. The debug port may provide access by an external debugger to each of the processor cores, and may also include a control unit operable to provide various control functions related to debugging operations. The IC may also include a power management unit (PMU) that may selectively put the processor cores to sleep and/or remove power from processor cores. A group of registers accessible by the control unit may be coupled to the debug bus. The group of registers may include a register that may be programmed by the external debugger in conjunction with a reset of the IC or prior to the reset, or when the PMU removes power from one or more of the processor cores. The register may include a number of bit positions or bit position groups, each of which corresponds to a unique one of the processor cores. If a bit position or a bit position group corresponding to a particular processor core is programmed to halt the processor, a signal may be asserted to that processor core while the processor core is in reset. When the processor core exits the reset state, the processor core may detect the signal may. Responsive to detection of the signal, the processor core may halt operation prior to the execution of an initial instruction after the reset.

The method and apparatus described herein may enable an external debugger to perform a number of debugging functions that may not otherwise be possible. For example, an external debugger may program the registers discussed above to enable debugging of a boot-up sequence. Furthermore, since executing instructions may change the state of a processor core, the ability to halt operation before any instructions are executed may enable debugging to begin from a known reference point. Specifically, providing the ability to program, prior to a reset, the debug registers to halt the processor after the next reset may simplify debugging while still permitting the halt of the processor prior to executing any instructions. The deferral of the halt until the reset may improve the ability to debug systems that may frequently put processors to sleep and awaken the processors (e.g. via a reset).

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Integrated Circuit (IC) with Debug Port

Figure 1:
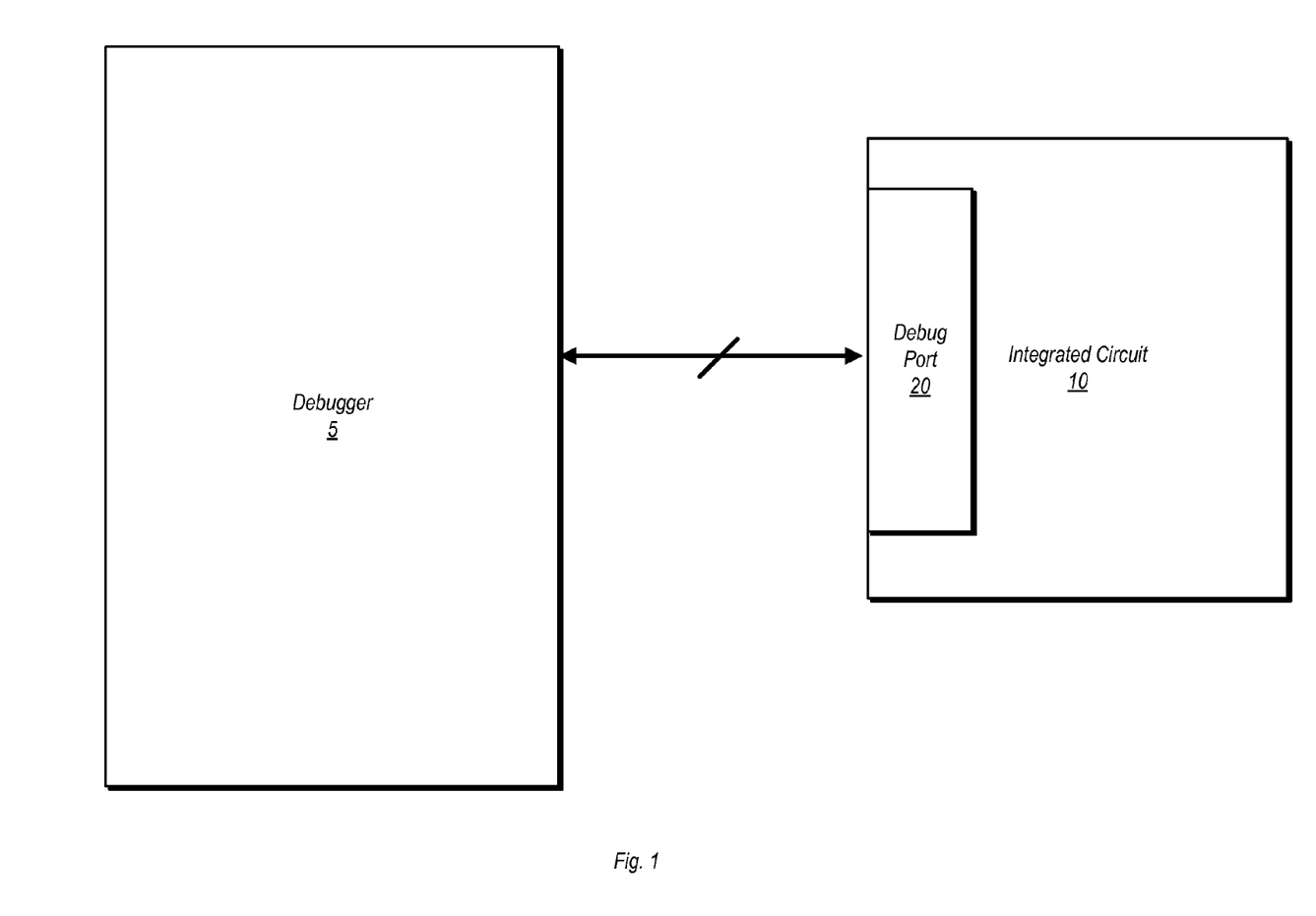
FIG. 1 is a block diagram illustrating a connection of an external debugger to one embodiment of an IC for accessing internal components thereof.

Turning now to FIG. 1, a block diagram illustrating a connection of an external debugger to one embodiment of an integrated circuit (IC) for accessing internal components thereof is shown. In the embodiment shown, IC 10 is coupled to external debugger 5 via debug port 20. Debugger 5 may be a computer system or other type of test equipment operable to perform various types of tests of IC 10 and components thereof. In particular, debugger 5 may be used in debugging the design of IC 10 and software written to execute thereupon. As defined herein, debugging may include determining if any hardware errors are present within IC 10. Debugging may also include determining whether or not software correctly executes on IC 10.

As will be discussed below, IC 10 may include a number of internal components that may be accessed by debugger 5 through debug port 20. Such components may include cores of a processor (e.g., execution cores), but may include other components as well (e.g., input/output units, etc.). Debugger 5 may provide test stimulus data to one or more components of IC 10 through debug port 20 and may initiate testing. Results of the test data may be received by debugger 5 through debug port 20. In addition to providing test stimulus data, debugger 5 may also provide various control signals and programming information to control certain operations within IC 10 during debugging. For example, when debugging software intended to execute on IC 10, debugger 5 may insert breakpoints to cause one or more components to stop operation and thus allow the state of such components to be retrieved for further analysis. Debugger 5 may also send control signals and programming information to IC 10 to cause certain components to be powered on, powered off, reset, or halted in various situations.

Figure 2:
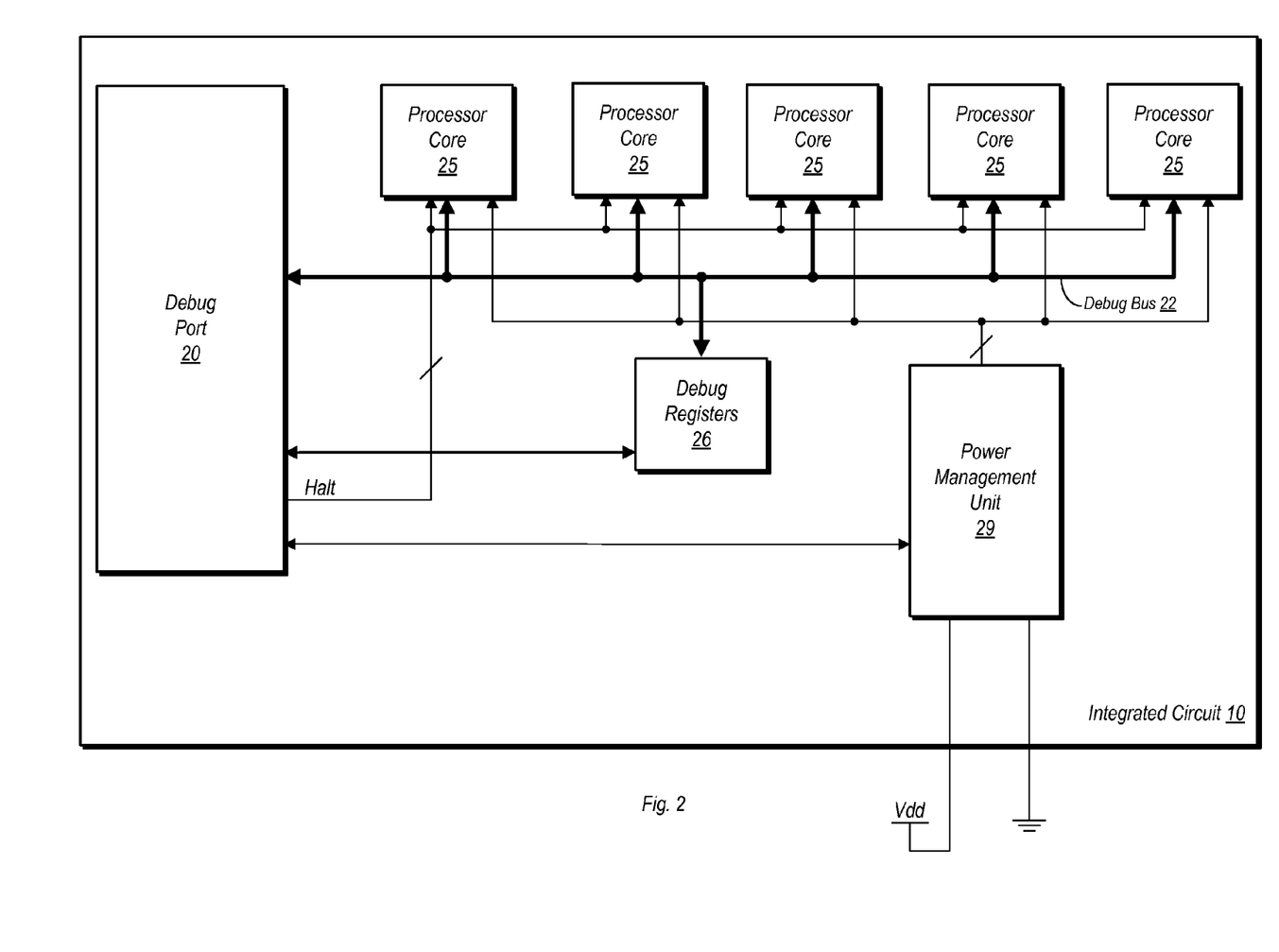
FIG. 2 is a block diagram of one embodiment of an IC.

FIG. 2 is a block diagram illustrating one embodiment of IC 10 in further detail. In the embodiment shown, IC 10 includes a plurality of processor cores 25 that are coupled to debug port 20 via debug bus 22. IC 10 may be a heterogeneous (or asymmetric) multi-core processor in one embodiment, wherein various ones of the processor cores are different from each other. IC 10 may be a multi-core processor designed for use in a mobile platform, such as a smart phone, a laptop computer, or other mobile device, wherein each of the various processor cores 25 are dedicated to particular tasks. For example, one processor core 25 may be dedicated to performing audio-related tasks, another processor core 25 may be dedicated to graphics/video related tasks, while one or more other ones of the processor cores may be dedicated to executing instructions not explicitly related to audio and/or video tasks. It is noted however, that embodiments of IC 10 that implement a homogenous multi-core processor (i.e. where all processor cores are identical) are possible and contemplated. Other possible embodiments of IC 10 include application specific integrated circuits (ASICs) and other types of ICs.

IC 10 also includes a set of debug registers 26 coupled to debug bus 22. Debug registers 26 may include a number of different registers that may store information for use during debugging. Some of the registers may be used to trigger certain actions within IC 10 during debugging, while others may store information specifying certain conditions or parameters. Additional details of certain ones of registers 26 will be discussed below.

Debug Port 20 in the embodiment shown may provide one or more physical connections for an external debugger (e.g., debugger 5 of FIG. 1) for performing debugging operations. These connections may include a Joint Test Action Group (JTAG) connection, a Serial Wire Debug (SWD) connection, and/or other types of connections that may be used with an external debugger. Debug Port 20 may also include various types of functional circuitry to support these connections.

In the embodiment shown, debug port 20 includes logic circuitry which may provide certain control functions for controlling operation of itself and other circuitry of IC 10 during debugging. Some of these control functions may be specified by information stored in debug registers 26, and thus debug port 20 is coupled thereto via a bidirectional connection. Debug port 20 may thus write information into various ones of debug registers 26, and may also read information from the same. Furthermore, debug port 20 may also have the capability of clearing certain ones of registers 26.

In the embodiment shown, debug port 20 is configured to provide halt signals ('Halt') to each of processor cores 25. It is noted here while the signal path of the halt signal is depicted using a single line (for the sake of simplicity), unique instances of the halt signal may be provided to each of processor cores 25. When a halt signal is asserted to a given processor core 25, that core may halt operation prior to execution of a first instruction upon exiting a reset state or restoring power thereto. This may enable the inputting of test stimulus that allows the operation of a core or software executing thereon to be debugged beginning with a first instruction to be executed. Individual instances of the halt signals may be asserted responsive to programming in particular ones of debug registers 26, as will be discussed in further detail below.

IC 10 in the embodiment shown includes a power management unit (PMU) 29. PMU 29 is coupled to receive a supply voltage ('Vdd'), and may selectively put the processor core or cores 25 to sleep. A processor core that is asleep is not executing instructions. The core may be clock gated, the clock source (e.g. one or more phase locked loop (PLLs)) may be shut down, or the core may even be powered off in various implementations and/or levels of sleep. During normal (i.e. non-debug operations), PMU 29 may put to sleep/power off those processor cores 25 that have been idle for a particular amount of time. Furthermore, PMU 29 may also awaken sleeping processors (restoring power to powered off processor cores 25 to enable their re-activation and/or resetting processor cores). In some embodiments, PMU 29 may control the voltage levels for providing power to processor cores 25, providing higher voltages when performance demand is greater and lower voltages when performance demand is lower.

During debug operations, may cause a reset of selected ones or all of processor cores 25 by asserting a reset signal and/or powering up a core to reawaking the core. If the debug registers 26 have been programmed with a deferred halt, the debug port 20 may assert the halt signal for the corresponding processor core(s) during power up/reset.

Figure 3:
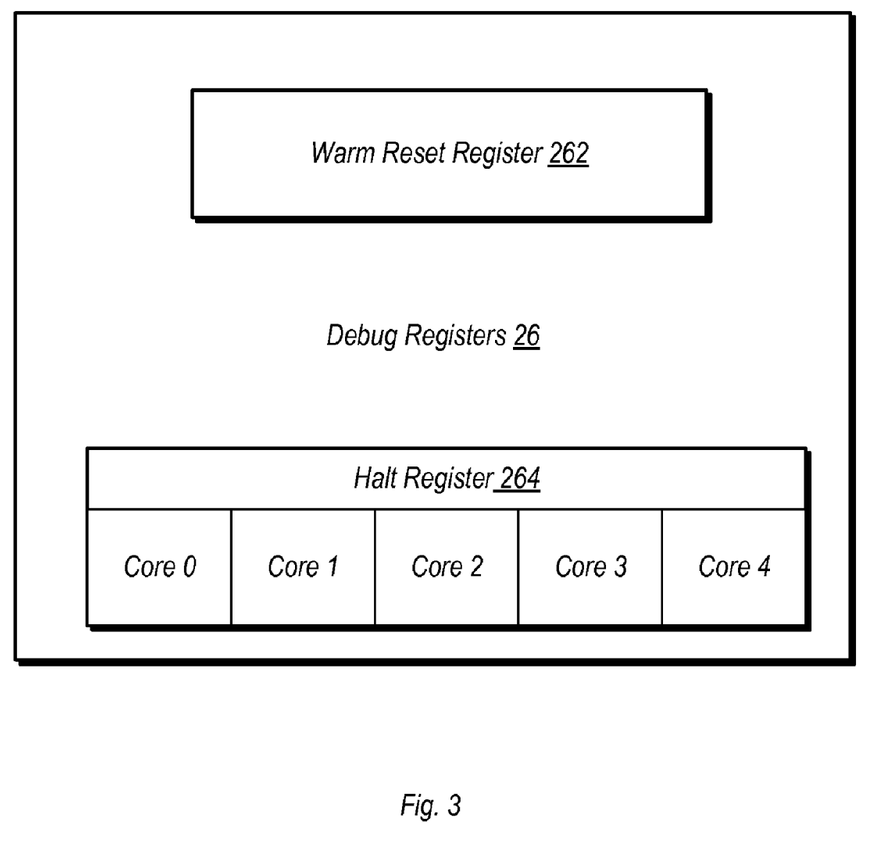
FIG. 3 is a block diagram of one embodiment of a block of registers used in debugging an IC.

Debug Registers:

FIG. 3 is a block diagram of one embodiment of a block of registers used in debugging an IC. More particularly, FIG. 3 illustrates particular ones of debug registers 26. It is noted however that additional registers not discussed here may also be included in debug registers 26.

In the embodiment shown, debug registers 26 includes a warm reset register 262. When programmed, warm reset register 262 may cause a warm reset of IC 10 or portions thereof. As used herein, the term 'warm reset' refers to a reset wherein each of processor cores 25, a subset of the processor cores 25, (and possibly other circuitry) is reset, but circuitry within the debug domain is not reset. For example, debug port 20, debug registers 26, and other debug circuitry not explicitly discussed here may remain active while processor cores 25 and other non-debug circuitry is reset during the warm reset. It is noted that at some components of PMU 29 may also be exempt from a reset during a warm reset operation, as such components may be used to initiate the reset. In the embodiment shown, the warm reset may be indicated with as few bits as one. However, embodiments of a warm reset register 262 having a greater number of bits are possible and contemplated. For example, a bit per processor core 25 may be used to individually reset cores.

Also included in this embodiment of debug registers 26 is a halt register 264. In the embodiment shown, halt register 264 is subdivided into a number of different sections, each of which corresponds to a particular one of processor cores 25. Each subsection may include one or more bits. When a particular subsection is programmed by external debugger 5, the programming may be detected by circuitry within debug port 20. Responsive to initiation of a warm reset, or PMU 29 powering off the particular processor core 25, debug port 20 may assert a corresponding halt signal ('Halt'). Particularly, the halt signal may not be asserted immediately upon programming the register 264, but rather may be asserted during reset or after power down of the corresponding processor core 25. The halt signal may be received on a corresponding input of the particular processor core 25. Responsive to detecting the asserted halt signal upon exiting the reset state or otherwise having power restored thereto, the particular processor core 25 will halt operation prior to executing a first instruction. This may enable debugger 5 to begin testing or debugging of the particular processor core 25 from a known state, instead of a state that has been altered by the execution of instructions.

It is noted that each of the sections of halt register 264 may be programmed independently of one another. Accordingly, halt signals may be selectively asserted to some processor cores 25 and not asserted to others. This may in turn enable the halting of some processor cores 25 upon exiting a warm reset or having power restored thereto, while other processor cores 25 are allowed to being executing instructions (e.g., per a boot process or for resuming from a sleep state). In general, the ability to cause selected ones of processor cores 25 to halt upon exiting a reset or being powered on may provide an extra level of flexibility in performing debug operations. Furthermore, if desired, all sections of halt register 264 may be programmed in some instances to cause all processor cores 25 to halt upon exiting reset or otherwise having power restored thereto.

Figure 4:
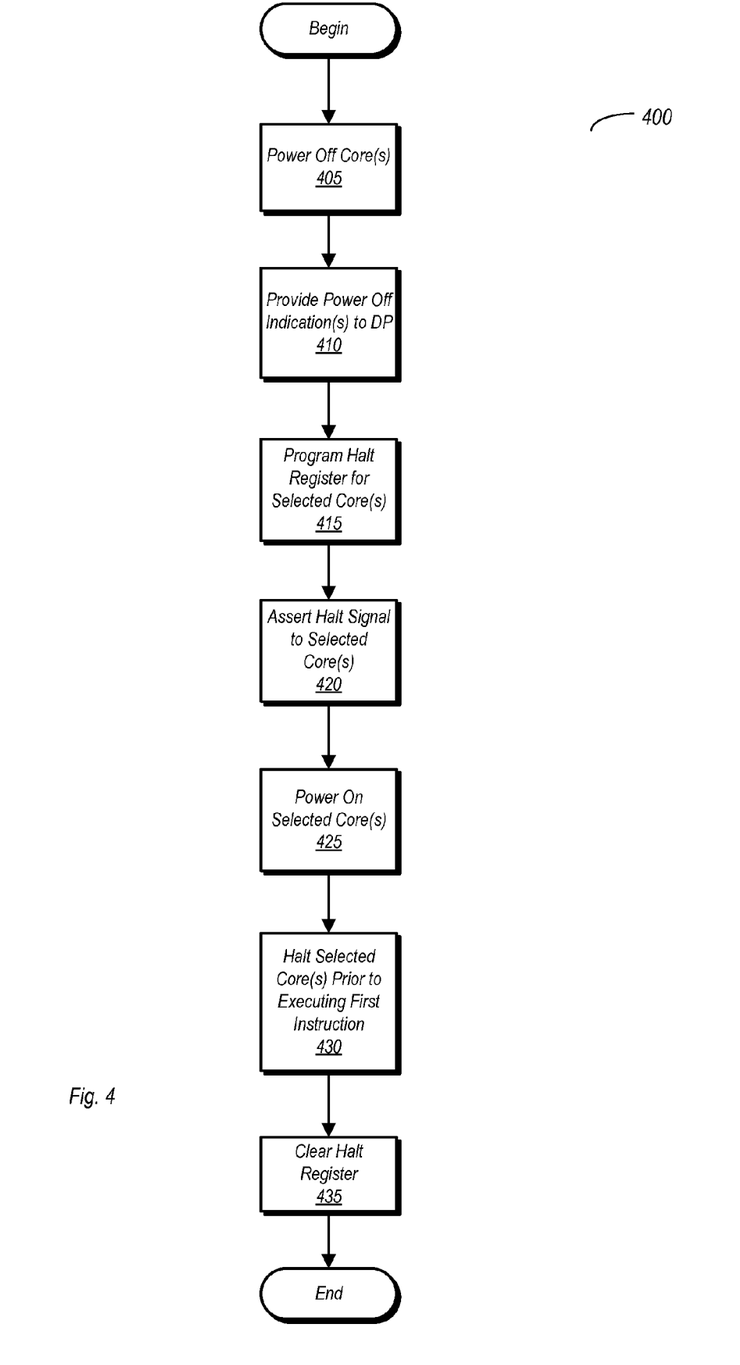
FIG. 4 is a flow diagram of one embodiment of a method for halting operation of a functional block of an IC when restoring power.

Method Flow Diagrams:

FIG. 4 is a flow diagram of one embodiment of a method for halting operation of a functional block of an IC when restoring power. Method 400 will be discussed below with reference to the hardware embodiments discussed above. However, it is noted that method 400 may be used with other hardware embodiments not discussed herein.

Method 400 begins with the powering off of one or more processor cores 25 (block 405). The powering off of the processor core(s) 25 may occur during the performance of debugging operation. When PMU 29 powers off the processor core(s) 25, it may provide an indication to debug port 20 (block 410). In some cases, the indication received by debug port 20 may be relayed to debugger 5, which may take action responsive thereto, such as programming other registers. In the embodiment shown, halt register 264 may be programmed for at least one of the processor core(s) 25 that is powered off (block 415). Alternatively, the halt register 264 may be programmed prior to the power down, and the debug port 20 may delay assertion of the halt signal until the power down occurs. The programming of halt register 264 may be detected by debug port 201. Responsive to detecting the programming of halt register 264 and the powering down of the processor core 25, debug port 20 may assert and provide halt signals to the processor core(s) 25 corresponding to the programmed sections of halt register 264 (block 420).

At some point in time subsequent to powering off the processor core(s) 25, PMU 29 may re-apply power to these core(s) (block 425). When power is re-applied, the processor core(s) 25 receiving a respective halt signal may halt operation prior to execution of a first instruction (block 430). Halting the processor core(s) 25 before any instructions are executed may preserve an initial state present when power is initially applied. This may in turn allow debugger 5 to control or monitor the state of a given processor core 25 from its beginning of operation. This can be useful in different ways, such as when debugging a boot-up sequence.

Subsequent to restoring power to the processor core(s) 25 and halting operation of those for which respective halt signals are asserted, the halt register may be cleared.

Figure 5:
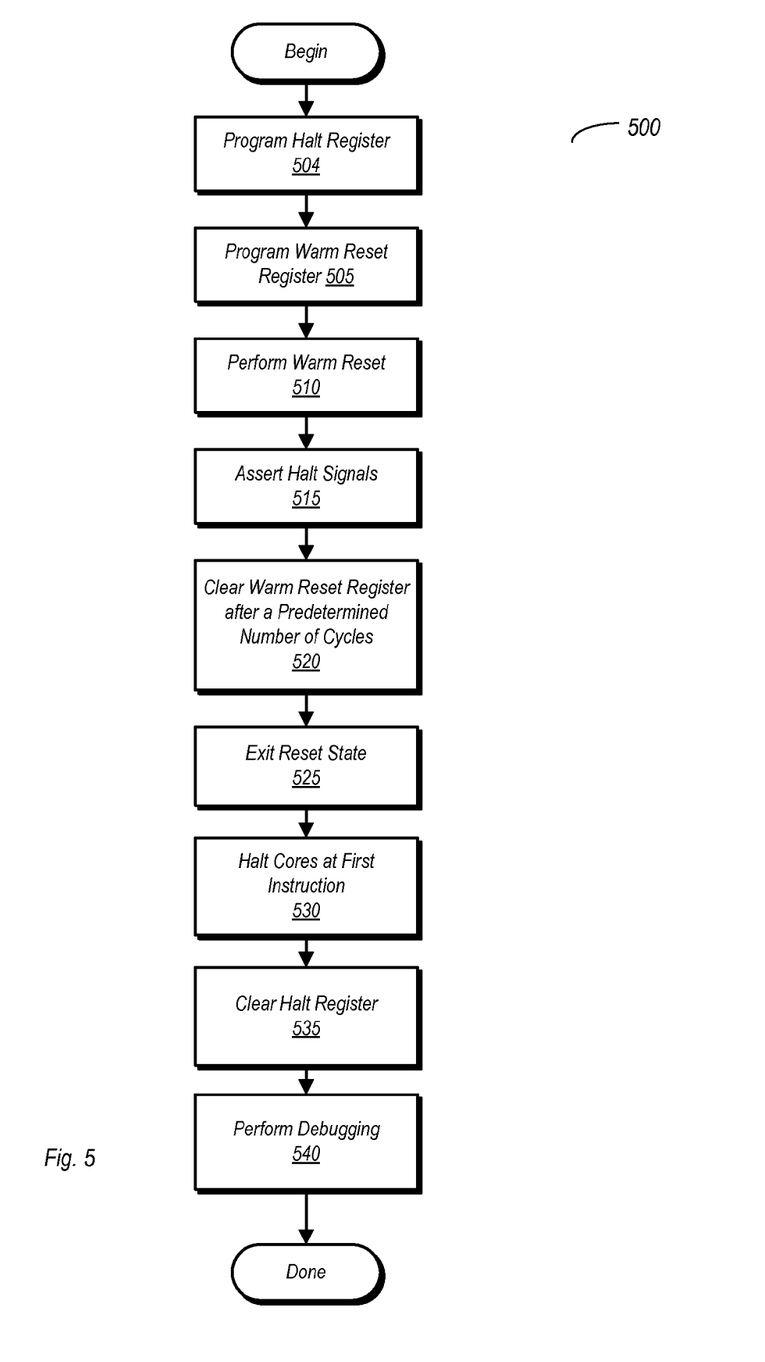
FIG. 5 is a flow diagram of one embodiment of a method for performing a warm reset of an IC.

FIG. 5 is a flow diagram of one embodiment of a method for performing a warm reset of an IC or a particular processor core 25. As with the embodiment of method 400 previously discussed, method 500 is discussed herein with reference to the various hardware embodiments discussed in reference to FIGS. 1-3. However, it is noted that method 500 may be used with other hardware embodiments not explicitly discussed herein.

Method 500 begins with debugger 5 programming warm reset register 262 and one or more sections of halt register 264 (blocks 504 and 505). As discussed previously, the halt register 264 may be programmed at any point prior to programming the warm reset register 262. Debug port 20 may also provide an indication to PMU 29 of the programming of the warm reset register, thereby causing the performance of a warm reset (block 515). Debug port 20 may assert and provide halt signals to the processor core(s) 25 corresponding to the programmed section(s) of halt register 264 responsive to the warm reset (block 515). During a warm reset, components that are not part of the debug domain may be reset. For example, in IC 10 of FIGS. 1-2, each of processor cores 25 may be reset during a warm reset, as well as other components that are not explicitly shown (e.g., input/output circuitry). However, during the warm reset, circuitry of the debug domain, including debug port 20, registers 26, and any other circuitry of the debug domain not explicitly shown or discussed here may be exempt from the reset. PMU 29 may also be exempt from the reset during a warm reset. In some embodiments, PMU 29 may actually initiate the warm reset.

The reset state may be held for a certain number of cycles of a clock signal of IC 10 subsequent to its initiation. After the certain number of clock cycles has completed, warm reset register 262 may be cleared (block 520). In some embodiments, clearing of warm reset register 262 may be accomplished in one embodiment by debugger 5 writing a value of '0' to the register. In another embodiment, warm reset register 262 may include a self-timer that causes the register to be cleared once the predetermined number of clock cycles has elapsed.

Responsive to clearing warm reset register 262, those components subject to the reset may exit the reset state (block 525). When the reset state is exited, the processor core(s) 25 receiving an asserted halt signal may halt operation prior to the execution of a first instruction (block 530). Thus, the processor cores 25 for which a halt signal was asserted may receive power but may retain a state equivalent to that of being powered on with no instructions having been executed.

Subsequent to exiting the reset state, halt register 264 may be cleared (block 535). Thereafter, debugging operations may begin (block 540).

Figure 6:
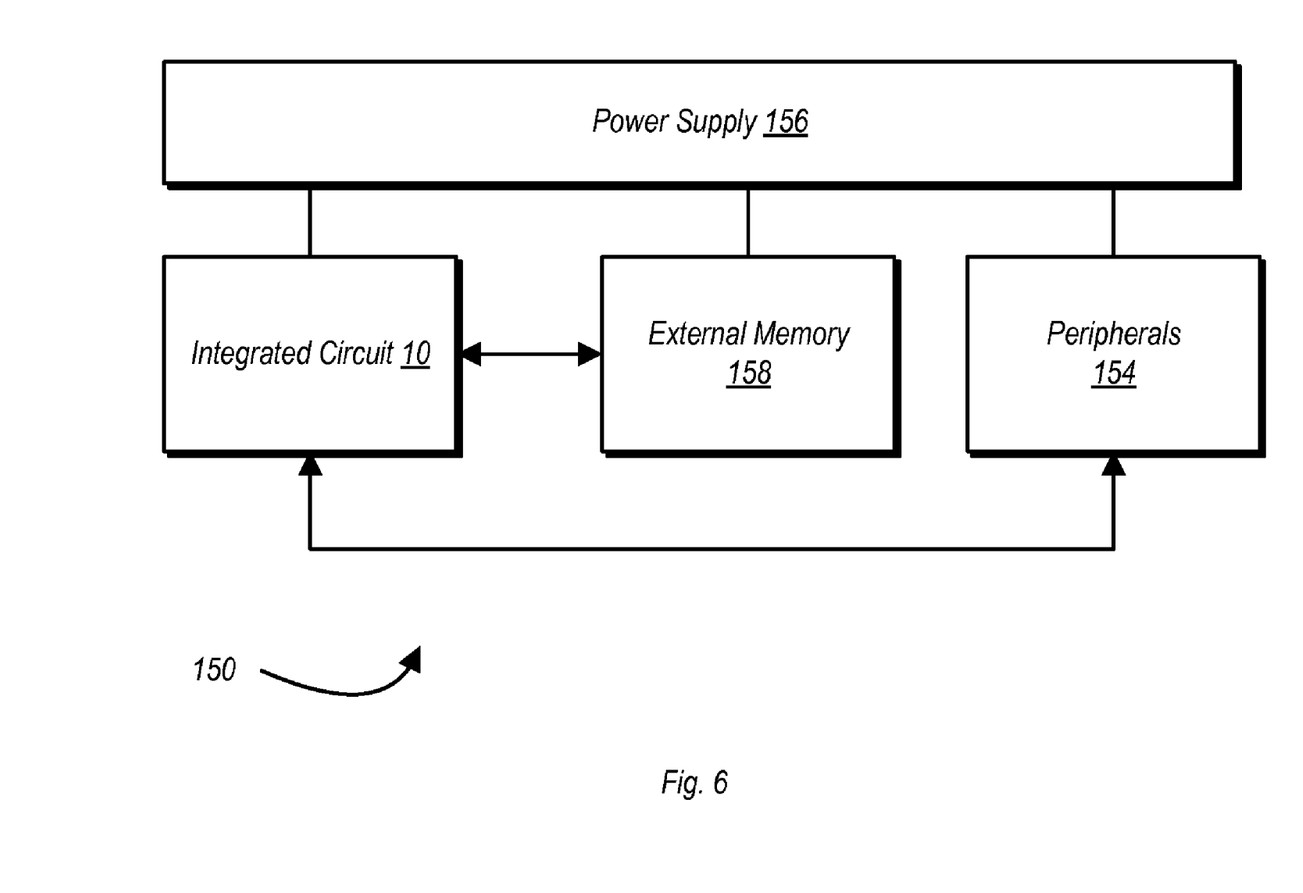
FIG. 6 is a block diagram of one embodiment of an exemplary system.

Exemplary System:

Turning next to FIG. 6, a block diagram of one embodiment of a system 150 is shown. In the illustrated embodiment, the system 150 includes at least one instance of an IC 10 (from FIG. 1) coupled to one or more peripherals 154 and an external memory 158. A power supply 156 is also provided which supplies the supply voltages to the IC 10 as well as one or more supply voltages to the memory 158 and/or the peripherals 154. In some embodiments, more than one instance of the IC 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
one or more functional units;
a power management unit (PMU) configured to selectively remove power from each of the one or more functional units independently of one another;
a debug port coupled each of the one or more functional units by a debug bus; and
a plurality of debug registers coupled to the debug bus, wherein the plurality of debug registers includes a halt register, wherein the debug port is configured to convey signals to program the halt register with a first value, and wherein responsive to the halt register being programmed with the first value, the first functional unit is configured to halt operation upon the PMU restoring power thereto, and wherein the debug port is configured to delay the halt of the first functional unit until the power down event occurs.

2. The integrated circuit as recited in claim 1, wherein the debug port is operable for coupling to an external debugger, and wherein the debug port is configured to convey signals received from the external debugger in order to program the halt register.

3. The integrated circuit as recited in claim 1, wherein the debug port is further configured to convey signals to program the halt register with a first value responsive to an indication of a reset of the first functional unit, wherein the first functional unit is configured to halt operation upon exiting a reset state.

4. The integrated circuit as recited in claim 1, wherein the debug port, when the halt register is programmed, is configured to cause a first signal to be asserted to the first functional unit during the power down event.

5. The integrated circuit as recited in claim 4, wherein, upon a restoration of power or an exit from a reset state, the first functional unit is configured to halt at a time of execution of a first instruction.

6. A processor comprising:
a plurality of execution cores;
a debug unit, the debug unit including an access port configured for coupling to an external debugger;
a bus coupled between each of the plurality of execution cores and the access port;
a plurality of registers coupled to the bus including a first register and a second register, wherein the second register includes a plurality of bit positions divided into a plurality of subsets of one or more bits, wherein each of the subsets corresponds to a unique one of the execution cores, and wherein responsive to the external debugger programming the first and second registers, the processor is configured to:
perform a reset of each of the execution cores of the processor, wherein the access port is excluded from the reset; and
halt operation of at least one of the execution cores upon exiting the reset, wherein the halting is delayed until the exiting in the case that the halt is programmed into the registers prior to the reset.

7. The system as recited in claim 6, wherein responsive the debugger programming a particular subset of one or more bits, the debug unit is configured to assert a signal and provide a signal to a corresponding one of the execution cores.

8. The system as recited in claim 7, wherein the corresponding one of the execution cores is configured to halt execution of instructions upon exiting the reset state when the signal is asserted.

9. The system as recited in claim 6, wherein the processor is configured to release the reset responsive to a clearing of the first register.

* * * * *